United States Patent [19]
Vogel

[11] 3,788,623
[45] Jan. 29, 1974

[54] VERTICAL MELTING FURNACE

[76] Inventor: Ralph A. Vogel, Box 283 R.R. 5, Three Rivers, Mich. 49093

[22] Filed: Oct. 18, 1971

[21] Appl. No.: 190,061

[52] U.S. Cl. ................................. 266/33 R, 266/43
[51] Int. Cl. ............................................ F27b 1/14
[58] Field of Search .................. 75/43, 65 R, 72–74; 110/1 A, 1 C; 263/29, 46; 266/33 R, 25, 40, 33 S, 38, 43

[56] References Cited
UNITED STATES PATENTS

| | | | |
|---|---|---|---|
| 1,882,571 | 10/1932 | Hamlin | 75/65 R |
| 240,136 | 4/1881 | Ibrugger | 266/40 |
| 1,661,742 | 3/1928 | Waern | 263/29 |
| 2,815,278 | 12/1957 | Wilkins | 266/33 S |

FOREIGN PATENTS OR APPLICATIONS

| 24,366 | 11/1902 | Great Britain | 266/33 R |
|---|---|---|---|

*Primary Examiner*—Gerald A. Dost
*Attorney, Agent, or Firm*—Molinare, Allegretti, Newitt and Witcoff

[57] ABSTRACT

A vertical furnace for melting metal pieces, such as pieces of copper cathode. The furnace has a wall of refractory brick material which encloses an upright melting chamber having a plurality of burner openings through the inner surface of the wall, heat being injected through the openings to melt the metal pieces. An outlet drains the molten metal from the bottom of the chamber. A plurality of upright brick sections are constructed unitary with the wall and project inwardly from the wall. The upright sections are located on opposite sides of each burner opening so as to maintain the metal pieces in spaced relationship from the burner openings and thereby prevent blockage thereof. The bottom of the furnace has a reverse arch shape and is also formed of refractory brick material. The reverse arch shape assists in maintaining the brick pieces, forming the bottom, in the desired set condition. Channels are provided in the wall and communicate between the burner openings and the burners, which are spaced outwardly of the burner openings at a slight angle so that any molten metal entering the channel will drain therefrom simply by action of gravity.

9 Claims, 3 Drawing Figures

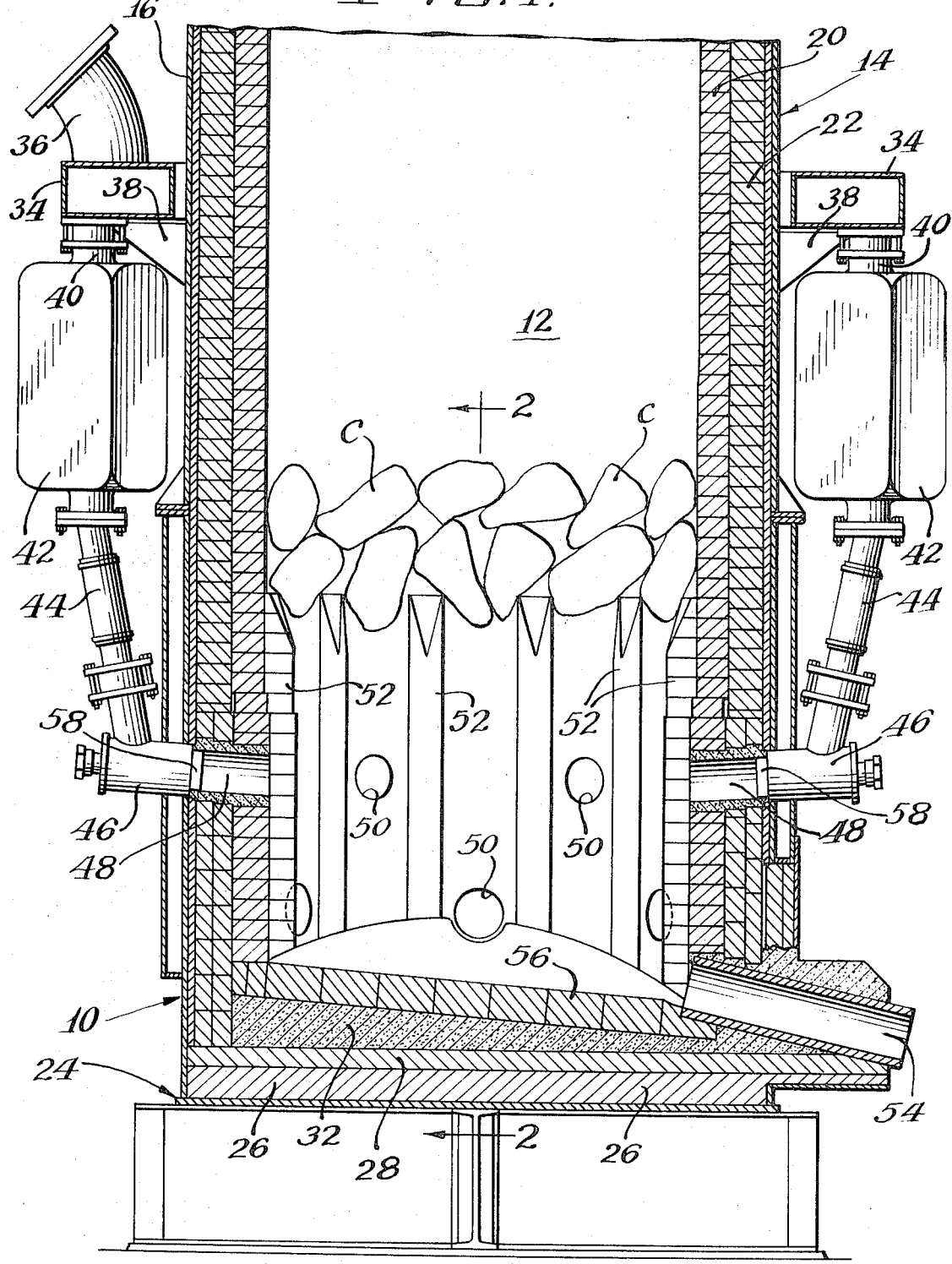

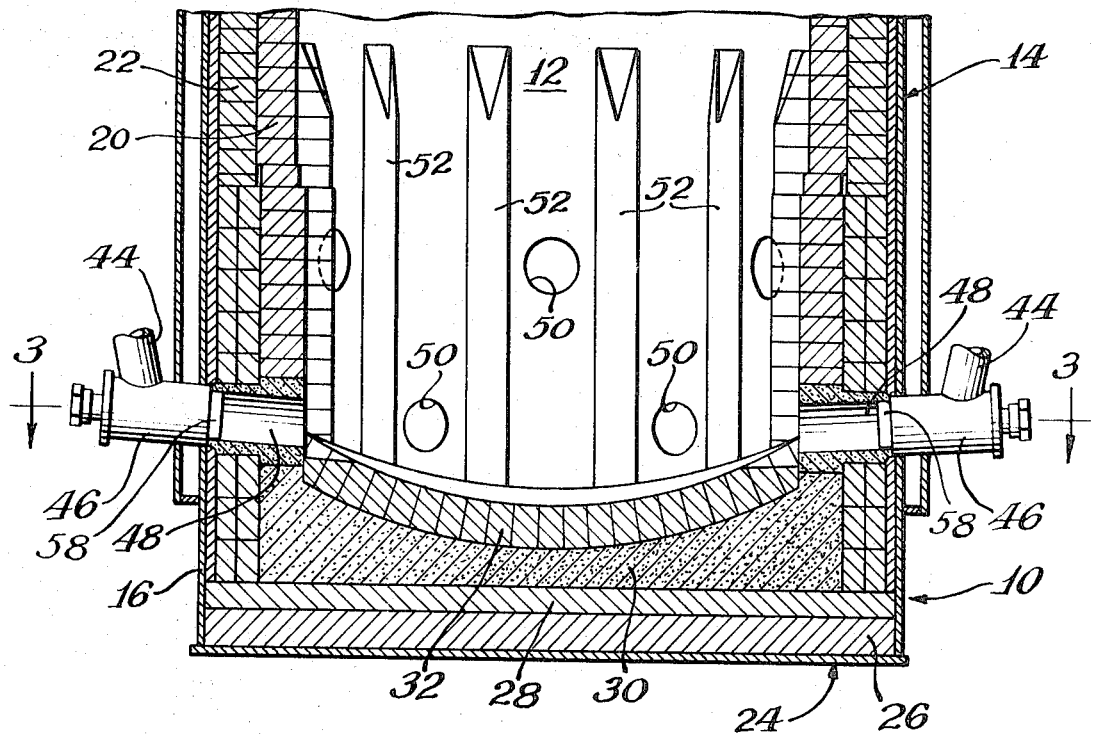
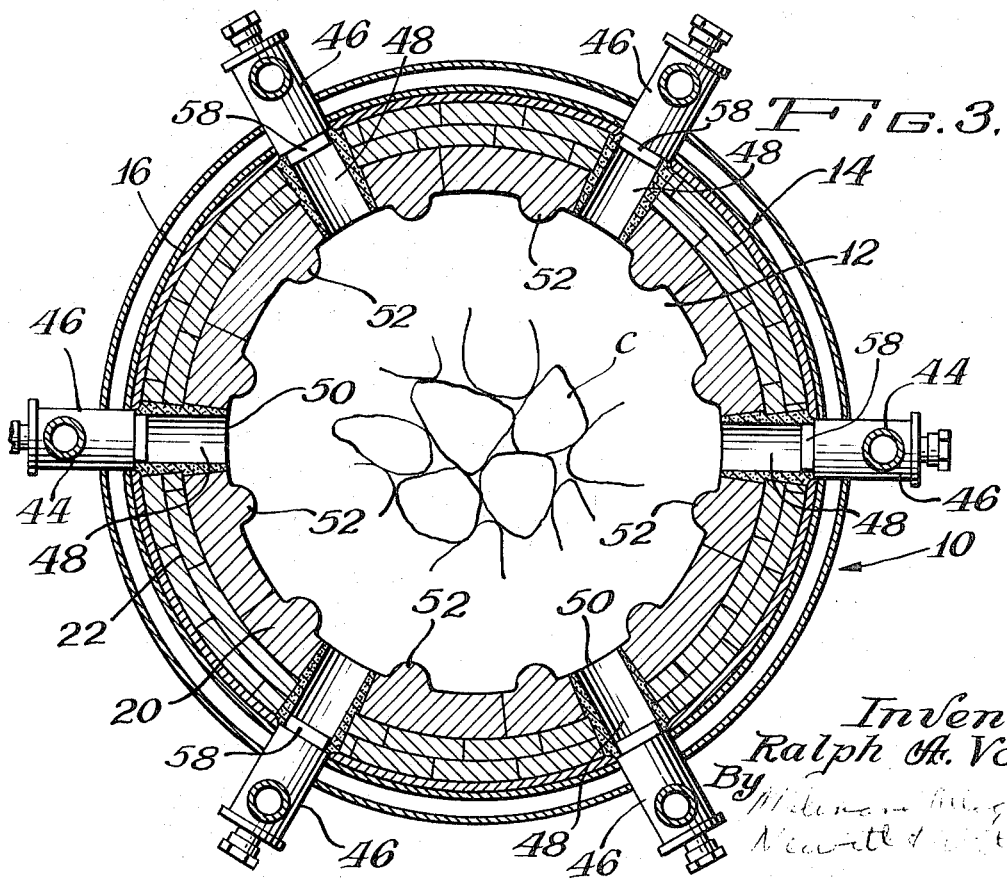

VERTICAL MELTING FURNACE

BACKGROUND OF THE INVENTION

1. Field of the Invention
2. Description of the Prior Art

This invention relates to an improved vertical furnance construction which is particularly useful for melting metal pieces, particularly pieces of copper cathode.

Vertical gas-fired furnaces for melting metal, such as copper, are well known. One such vertical furnace is seen in the Phillips et al. U.S. Pat. No. 3,199,977. Other such furnaces may be seen in some of the prior art patents cited in the Phillips et al. patent. Generally, these furnaces have a substantially cylindrical shape and are elongated in a vertical direction. The metal to be melted, such as copper cathode pieces having a low oxide content, is charged into the furnace from an elevated position. The cathode pieces drop towards the bottom of the furnace, where a plurality of burners inject heat into the furnace to cause the metal to melt. The molten metal, as copper, is drained from the furnace by a suitable outlet in the bottom and the molten metal then passes to a holding furnace or to a casting operation.

One problem encountered with vertical furnaces is that the burner outlet at which the flame enters the melting chamber can become substantially blocked by pieces of metal which pass downwardly through the furnace before they are completely melted. Several problems arise if the melting pieces block or close off one or more of the burner openings. One problem encountered by such blockage is that the blocked burner may backfire, which may cause a malfunction and/or damage the burner itself and to adjacent parts. Additionally, undue blockage of a burner opening causes a loss of heating capacity, and creates a loss of furnace efficiency. In addition, if the metal mechanically blocks off the burner, incomplete combustion may result. This is considered to be particularly undesirable because there is an adverse effect on the oxygen content of the metal being melted. Since the burner ignites a mixture of fuel and an oxygen containing gas, incomplete combustion results in excess oxygen being injected into the furnace and the oxygen could be raised above desired or acceptable levels.

Still, further, other problems that have been encountered with vertical furnaces are a result of their construction from brick material. Normally the walls and bottoms of vertical melting furnaces are constructed of refractory material, such as a heat resistant or fire brick, and the brick pieces are joined together by a suitable heat resistant cement. When a flat brick bottom is provided in the furnace, the combination of high temperatures, as over 2,000°F., with molten metal in the furnace bottom cause the bricks to loosen and bricks have actually been found to float in the molten metal in the furnace bottom. Such a condition cannot be tolerated and ultimately the furnace must be shut down for repairs. Such an undue shutdown represents a significant economic loss.

Still further, burner openings are normally located adjacent a port which passes through the furnace wall and extends to the burner where the fuel-air mixture is ignited. Normally, these ports are substantially horizontal and some of the metal being melted in the furnace may enter the channel and may collect therein. This condition can cause blockage at the burner possibly resulting in problems similar to those encountered where there is blockage of burner openings by the metal pieces being melted. Thus, although vertical furnaces are well known in the art, and generally function quite well, significant improvements can be made therein.

SUMMARY OF THE INVENTION

It is therefore an important object of this invention to provide an improved vertical furnace structure which substantially avoids disadvantages of prior art furnaces.

It is also an object of this invention to provide an improved vertical furnace wherein possible blockage of the burner openings in the inside furnace wall by metal pieces is substantially avoided by maintaining the pieces of metal in a position spaced inwardly of the openings.

It is a further object of this invention to provide an improved vertical furnace structure wherein upright and unitary inwardly projecting sections are located on both sides of each of the burner openings for maintaining metal in a position which is spaced inwardly of the burner openings so as to prevent blockage thereof.

It is yet another object of this invention to provide an improved furnace construction wherein the bottom portion thereof is maintained in the desired condition by a reverse arch shape provided therefor.

It is also another object of this invention to provide an improved arrangement for vertical melting furnaces wherein the ports extending through the furnace wall between the melting burner openings and the inner face of the furnace are sloped at a slight downward angle so that the molten metal will be carried by gravity away from the burners themselves.

Further purposes and objects of this invention will appear as the specification proceeds.

The foregoing objects are accomplished by providing a vertical furnace for melting metal pieces of somewhat irregular shape, such as copper cathode pieces, wherein the furnace is of the type which has a furnace wall of brick material which includes an upright melting chamber, a plurality of burner openings in the inner surface of the wall for injecting heat into the chamber to melt the metal pieces, and an outlet in the bottom of the chamber for discharging the metal from the chamber. A plurality of upright brick sections are constructed unitary with the inner face of the wall and project inwardly on either side of each of the burner openings so as to substantially maintain the metal pieces in a spaced relationship from the burner openings to prevent blockage thereof. The bottom of the furnace has a substantially reverse arch shape, having a central valley portion which is sloped upwardly from the outlet to the opposite wall so that melted metal drains from the bottom. The furnace bottom is constructed of pieces of brick which are joined together to provide the desired reverse arch shape which significantly assists in maintaining the bottom bricks in the desired set condition. Still further, ports are provided in the furnace wall and communicate with each of the openings in the wall. The ports are sloped downwardly at a small angle so that any molten metal entering the ports will be drained therefrom by the action of gravity.

BRIEF DESCRIPTION OF THE DRAWINGS

One particular embodiment of the present invention is illustrated in the accompanying drawings wherein:

FIG. 1 is a transverse, partially fragmentary, sectional view in elevation of a vertical furnace embodying my invention;

FIG. 2 is a fragmentary cross-sectional view of the vertical melting furnace of FIG. 1 and taken along the line 2—2 of FIG. 1; and FIG. 3 is a cross-sectional view taken along the line 3—3 of FIG. 2 showing the interior bottom portion of my furnace in plan view.

DETAILED DESCRIPTION OF THE PREFERRED EMBODIMENT

Referring to the drawings, a vertical melting furnace, generally 10, for melting irregular or regular shaped pieces of metal, such as copper cathode pieces, generally C, is shown. The furnace 10 is vertically elongated, the top portion of the furnace 10 being broken off and not shown. The unshown upper portion of the furnace 10 has an access opening through which the cathode C is dumped. Preferably, the furnace 10 is cylindrical in external shape and defines an inner cylindrical melting chamber 12. The furnace 10 has a wall 14 which is comprised of an outer metallic cylindrical panel or shell 16, an insulating brick section 22 and a working lining 20 of a refractory material such as fire brick or a carbide brick constructed to withstand the temperatures of the melting chamber 12, which may be well in excess of 2,000F.

The furnace 10 rests on a metallic foundation 24. Three separate layers of a refractory or heat resistant concrete material 26, 28, and 30 are provided for the furnace bottom. The top layer forming the bottom 32 of the furnace 10 has a reverse arch shape made of separate joined pieces of a carbide or fire brick material. All of the brick in the wall 14 and in the bottom 32 of the furnace 10 are held together by a cement or mortar capable of withstanding the temperature in the melting chamber 12.

The burner system for heating the furnace 10 to the melting temperature includes a fuel and oxygen containing gas mixing device (not shown) which intimately mixes the fuel and air at the desired fuel-air (or oxygen) ratio. The mixed fuel and air is directed from the mixing device to a manifold 34 through an inlet conduit 36. The manifold 34 substantially encircles or surrounds the shell 16 at its central portion and is secured to the metallic shell 16 by suitable support brackets 38. The fuel-oxygen mixture is passed downwardly from the manifold 34 through conduits 40 which are interconnected to a plurality of fire checks 42. From the fire checks, the separate streams of the air-fuel mixture pass downwardly through conduits 44 and to the burner assemblies 46. The fuel-air mixture is ignited at the burner assembly 46 by a suitable ignition device (not shown) and the heating flame is injected into the furnace melting chamber 12 through conduits or ports 48 provided in the lower portion of the wall 14 of the furnace 10. The ports 48 extend from each burner assembly 46 to each of a plurality of burner openings 50 provided in the inner surface of the furnace wall 14.

The copper cathode pieces C are conventionally of large, somewhat irregular shape and in order to prevent or maintain the copper cathode pieces C from blocking off or closing off the burner openings 50, it is important to locate a plurality of upright sections 52 on both sides of each of the openings 50. Each of the upright sections 52 is constructed of brick of the same material used to form the wall 14 and extends from the bottom 32 to a position at least several feet above the openings 50 so that the copper cathode C is properly spaced from the burner openings 50. The upright sections 52 are preferably not less than two and not more than four inches thick. Thus, these upright sections 52, which are substantially vertical and parallel to the axis of the furnace 10, substantially avoid problems encountered when there is blockage of the burner openings. By maintaining the cathode pieces C appropriately spaced from the openings 50, malfunction from backfire at the burners 46, reduction of heating capacity by such blockage, and incomplete combustion resulting in excessive oxide content in the melted and cast metal are substantially avoided. It is important that the upper ends of the upright vertical sections 52 be beveled or sloped downwardly at a substantial angle so that the copper cathode pieces C do not catch on the upper edges of the upright sections 52.

It also an important feature of the invention that both the inner layer 20 of the wall section 14 and the upright sections 52 rest on the upper peripheral portion of the reverse arch bottom 32. The reverse arch bottom 32, combined with the hold-down force also provided by the weight of the upright sections 52 and brick layer 20, substantially avoids loosening of the bricks forming the bottom 32. Such loosening can undesirably result in floating of the bricks in the melted metal and possible partial blockage of the outlet conduit 54 used for draining the melted metal from the furnace 10 to a holding furnace or to a casting operation.

It is also important that the bottom portion has a valley section 56 extending from the outlet conduit 54 and sloped at a small angle to a position diametrically opposite the outlet channel 54. In this way, the melted or copper flows downwardly along the reverse arch slope of the bottom 32 and down along the valley portion 56 formed in the bottom 32 for continuous draining of the melted metal from the melting chamber 12.

A further important feature of the invention is the sloping of the refractory ports 48 downwardly at a slight angle and away from the burner assemblies 46. In this way, any melted metal that enters the parts 48 will drain therefrom by action of gravity. This avoids undesired clogging of the openings in the burner screens 58 located at the outer ends of the ports 48, which blockage could also adversely affect burner operation.

While in the foregoing, there has been provided a detailed description of a particular embodiment of the present invention, it is to be understood that all equivalents obvious to those having skill in the art are to be included within the scope of the invention as claimed.

What I claim and desire to secure by Letters Patent is:

1. In a vertical furnace for melting pieces of metal, said furnace being of the type having an outer furnace wall enclosing an upright melting chamber, a plurality of burner openings in the inner surface of said wall for injecting heat into said chamber to melt said metal pieces, and an outlet in the bottom portion of said chamber for discharging said melted metal from said chamber, the improvement comprising a plurality of upright sections unitary with said wall and projecting inwardly therefrom, said sections being located on both sides of each of said burner openings for substantially maintaining said metal pieces in a spaced relationship from said burner openings.

2. The furnace of claim 1 wherein said wall and said unitary sections are made of refractory brick material, and said sections project inwardly approximately the thickness of said refractory brick material thereby spacing said metal pieces from said burner openings in an amount equal to said thickness.

3. The furnace of claim 1 wherein said unitary sections extend vertically above said burner openings to a height which is less than the height of said furnace wall, the upper ends of said unitary sections being sloped inwardly and downwardly to substantially avoid said metal pieces from catching on said sections.

4. The apparatus of claim 1 including a bottom for said furnace chamber, said wall, said upright sections and said bottom being of brick material and at least one layer of said brick material, defining said wall, engaging the upper peripheral portion of said bottom and the lower ends of said upright sections also engaging said upper peripheral portion of said bottom for assisting in maintaining said bricks in said bottom in their set condition.

5. In a vertical furnace for melting pieces of metal, said furnace being of the type having an outer furnace wall enclosing an upright melting chamber, said wall being formed of annular adjacent rows of refractory pieces, a plurality of burner openings in the inner surface of said wall for injecting heat into said chamber to melt said metal pieces, and an outlet in the bottom portion of said chamber for discharging said melted metal from said chamber, the improvement comprising a bottom having substantially a reverse arch shape portion and having a valley portion extending diametrically from one wall portion to said outlet, said valley portion being sloped from a high point adjacent said one wall portion to a low point at said outlet so said melted metal drains from said bottom to said outlet, said bottom being made of separate pieces of refractory material joined together to provide the desired shape, said refractory pieces in said bottom being at least partially maintained in their set condition by said reverse arch shape portion, and the inner most row of refractory pieces in said wall resting on the upper and outer periphery of said bottom and cooperating with said reverse arch shape portion for assisting in maintaining said bottom refractory pieces in their set condition.

6. The apparatus of claim 5 wherein ports are provided in said wall in communication with each of said burner openings, said ports being sloped downwardly at a small angle for directing any metal particles from within said ports by action of gravity.

7. A vertical furnace for melting pieces of metal, an outer furnace wall, an upright melting chamber enclosed by said outer furnace wall, a plurality of burner openings in the inner surface of said wall for injecting heat into said chamber to melt said metal pieces, a plurality of upright sections unitary with said wall and projecting inwardly therefrom, said sections being located on both sides of each of said burner openings for substantially maintaining said metal pieces in spaced relationship from said burner openings, an outlet in the bottom portion of said chamber for drawing said melted metal from said chamber, and ports in said wall communicating between each of said openings and their respective burner openings, said ports being sloped downwardly at a small angle for directing any melted metal from within said port and away from said burner openings by the action of gravity.

8. The apparatus of claim 7 including a bottom having a substantially reverse arch shape and having a portion extending diametrically from one wall portion to said outlet, said diametrical portion being sloped from a high point adjacent said one wall portion, to a low point at said outlet so that said melted metal drains from said bottom, said bottom being made of separate pieces of refractory material joined together to provide the said reverse arch shape, portions of said wall and portions of said unitary sections engaging the upper outer peripheral portions of said bottom for assisting in maintaining said refractory material pieces in the set condition.

9. In a vertical furnace for melting pieces of metal, said furnace being of the type having an outer furnace wall enclosing an upright melting chamber, a plurality of burner openings in the inner surface of said wall for injecting heat into said chamber to melt said metal pieces, and an outlet in the bottom portion of the chamber for discharging said melted metal from said chamber, the improvement comprising a bottom having substantially a reverse arch shape portion and having a valley portion extending diametrically from one wall portion to said outlet, said valley portion being sloped from a high point ad-jacent said one wall portion to a low point at said outlet so said bottom being made of separate pieces of refractory material joined together to provide the desired shape, said refractory pieces being at least partially maintained in their set condition by said reverse arch shape portion, and a plurality of upright sections unitary with said wall and projecting inwardly therefrom, said sections being located on both sides of said burner openings, said unitary sections having bottom portions resting on said upper peripheral portion of said bottom for assisting in maintaining said bottom in its set condition.

* * * * *